April 11, 1961 W. C. DUNLAP, JR 2,979,668
AMPLIFIER
Filed Sept. 16, 1957

INVENTOR.
WILLIAM CRAWFORD DUNLAP JR.
BY Vett Parsigian
ATTORNEY

United States Patent Office 2,979,668

Patented Apr. 11, 1961

2,979,668

AMPLIFIER

William Crawford Dunlap, Jr., Birmingham, Mich., assignor to The Bendix Corporation, a corporation of Delaware Filed Sept. 16, 1957, Ser. No. 684,229

5 Claims. (Cl. 330—36)

The invention relates to an amplifying circuit.

Certain semiconductors when maintained at sufficiently low temperatures, which for germanium may be 4° Kelvin (liquid helium), are subject to an impact ionization phenomenon which occurs at a critical voltage or electric field. At such temperatures the residual electrons or holes are bound to their centers or "frozen out" and the semiconductor becomes essentially non-conductive. When the critical voltage is applied to the semi-conductor, the residual electrons in the semiconductor are accelerated and collide with impurity atoms at a sufficient speed to ionize these atoms. This results in a cumulative ionization of the remaining impurity atoms, thus causing the resistance of the semi-conductor to break down when the critical voltage is applied. Also, an increased critical voltage is required to breakdown the semiconductor when it is subjected to a magnetic field.

When the impurity atoms are uniformly distributed throughout the semiconductor, it breaks down completely at the critical voltage. Accordingly, the resistance of the semiconductor is either at a high value or a substantially zero value at the critical voltage. For this reason the semiconductor could be suitably used for switching purposes but not for amplification purposes which would require a proportionate control over the resistance of the semiconductor. Amplification could be accomplished if a semiconductor were made so that its breakdown could be spread over a range of voltage.

This invention relates to an amplifying circuit which utilizes a semiconductor having a gradation of impurity atoms so that its breakdown may be controlled. In accordance with the invention the breakdown is proportionately controlled in accordance with the magnitude of the signal to be amplified. In this way the resistance of the semiconductor is proportionately reduced to increase the current flow in the circuit, thus producing the desired amplification.

An object of this invention is to provide an amplifying circuit which utilizes a semiconductor having a graduated density of impurity atoms so that its breakdown resulting from the impact ionization phenomenon may be controlled.

Another object is to provide such a circuit in which the semiconductor is subjected to a magnetic field the strength of which is controlled by the signal to be amplified so as to produce a proportionate breakdown of the semiconductor at a critical voltage applied to the semiconductor.

Other objects and advantages will become apparent from the following detailed description and from the appended claims and drawings.

Figure 1:
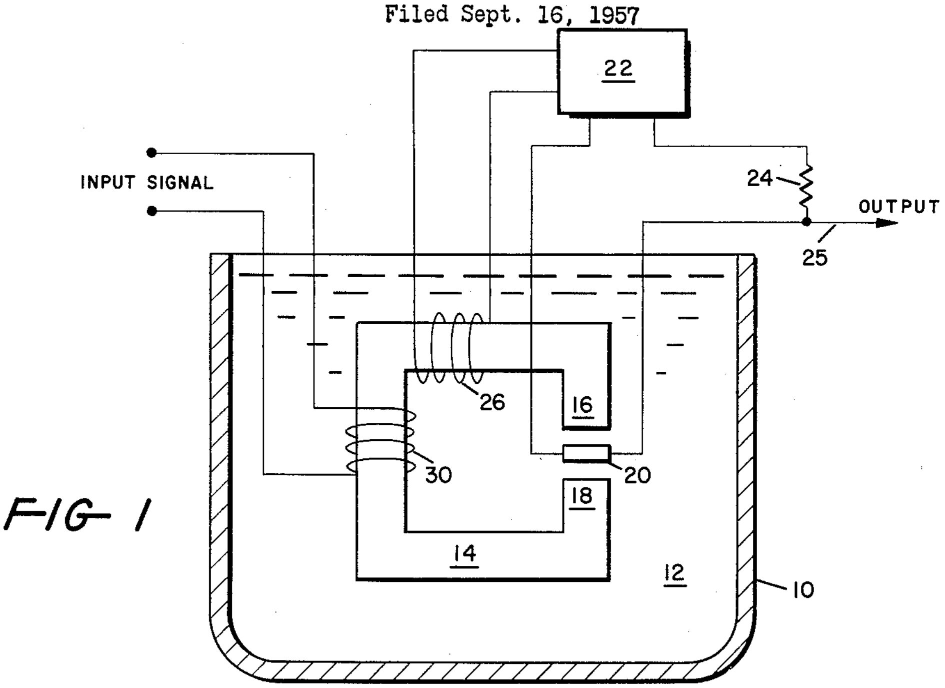
Figure 1 shows an embodiment of the invention.

Referring to Figure 1, an insulated container 10 may be filled with a liquid refrigerant 12, such as liquid helium having a temperature of 4° Kelvin. Immersed in the liquid 12 is a core 14 of magnetic material provided with opposing pole pieces 16 and 18. A semiconductor 20, such as a wafer of germanium, is disposed between the pole pieces 16 and 18.

Figure 2:
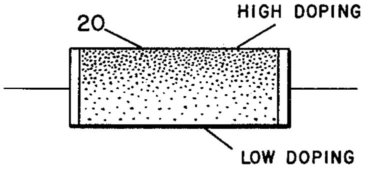
Figure 2 is an enlarged view of the semiconductor in Figure 1 showing the graduated concentration of impurity atoms.

The semiconductor 20 contains impurity atoms, such as antimony. The impurity atoms are distributed throughout the semiconductor in a non-uniform, graduated manner. For example, the graduation may be linear with respect to the thickness of the semiconductor as shown in Figure 2. It will be noted that the concentration of impurity atoms is highest at the top and it gradually decreases to the lowest concentration at the bottom. Such graduated doping of the semiconductor may be readily accomplished by controlled doping methods known to persons skilled in the art. Because of the fewer number of impurity atoms at the bottom, the impact ionization phenomenon occurs more readily at the bottom than at the top. Therefore, the bottom of the semiconductor 20 will break down first and under controlled conditions the area subject to breakdown will increase towards the top until the breakdown of the semiconductor is complete.

The semiconductor 20 is connected in a circuit including a D.-C. power supply 22 and a load resistance 24. The output line 25 is connected to a terminal of the load resistance 24.

Figure 3:
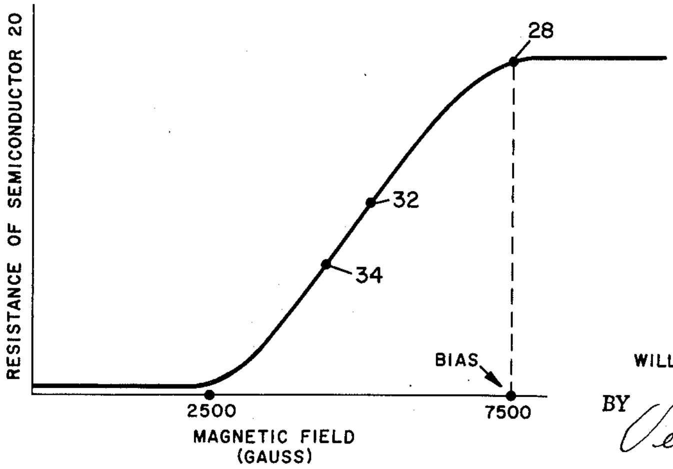
Figure 3 is a graph showing the resistance of the semiconductor when subjected to different magnetic field values.

A coil 26 is wound on the core 14 and a D.-C. bias is applied to its from the power supply 22. This produces a biasing magnetic field of a particular value to which the semiconductor 20 is subjected in the gap between the pole pieces. For example, the bias may be of a value to produce a magnetic flux of 7500 Gauss as shown on the graph in Figure 3 which is a plot of the resistance of semiconductor 20 versus the magnetic flux while maintaining the voltage applied to the semiconductor at a critical value, such as 200 volts which would cause the semiconductor to break down completely when the magnetic flux is reduced to a particular value, such as 2500 Gauss, or less. At the bias flux of 7500 Gauss the resistance of the semiconductor 20 is at its maximum as shown by the point 28 in Figure 3. At this point the impact ionization phenomenon has not occurred and no part of the semiconductor is in a breakdown condition. However, as the magnetic flux is reduced, an increased amount of the semiconductor 20 breaks down and its resistance is correspondingly reduced.

A coil 30 is also wound on the core 14 and is connected to receive the input signal to be amplified. The direction of the input signal is such as to oppose the bias of the coil 26 so that the magnetic flux is reduced an amount proportional to the input signal. When the flux is reduced the semiconductor breaks down a corresponding amount and its resistance is lowered. For example, an input signal of a particular magnitude may reduce the resistance of the semiconductor 20 to the point 32 and a signal of increased magnitude would cause a further breakdown and reduce the resistance to the point 34. In this way the amount of breakdown of the semiconductor 20 is controlled proportionately to the magnitude of the input signal, so as to produce a corresponding reduction of the resistance and an increase of current flow in the circuit to produce an output representing an amplification of the input signal.

The amplifier disclosed above has several advantages. It includes a minimum number of components and may, therefore, be constructed more cheaply than present amplifiers. Also, it may be made very compactly so as to require less space than present amplifiers. This compactness would be particularly advantageous for certain applications, such as in computers.

Having thus described my invention, I claim:

1. An amplifying circuit, including, an output load in the circuit, a semiconductor in the circuit, the semiconductor having a graduated concentration of impurity atoms, means for maintaining the semiconductor at a sufficiently low temperature to make it non-conductive, a voltage source in the circuit for applying to the semiconductor a voltage of particular magnitude sufficient to produce complete impact ionization in the semiconductor and in a direction having a component transverse to the direction of impurity concentration graduation, means for subjecting the semiconductor to a biasing magnetic field of sufficient magnitude to prevent any impact ionization in the semiconductor at the voltage of particular magnitude, and means for varying the magnetic field in accordance with an input signal to be amplified to control the extent of impact ionization in the semiconductor.

2. An amplifying circuit, including, an output load in the circuit, a semiconductor in the circuit, the semiconductor having a graduated concentration of impurity atoms, means for maintaining the semiconductor at a sufficiently low temperature to make it non-conductive, a voltage source in the circuit for applying to the semiconductor a voltage of particular magnitude sufficient to produce complete impact ionization in the semiconductor, said voltage being applied in a direction having a component transverse to the impurity concentration graduation means for subjecting the semiconductor to a magnetic field of sufficient magnitude to prevent any impact ionization in the semiconductor at the applied voltage of particular magnitude, and means for reducing the magnetic field an amount proportional to the magnitude of an input signal to be amplified to produce a proportionate amount of impact ionization in the semiconductor and a corresponding reduction in its resistance.

3. An amplifying circuit as recited in claim 2 wherein the impurity atoms in the semiconductor are graduated linearly with respect to the thickness of the semiconductor.

4. A switching circuit, including, an output load in the circuit, a semiconductor in the circuit, the semiconductor having a graduated concentration of impurity atoms, means for maintaining the semiconductor at a sufficiently low temperature to make it non-conductive, a voltage source in the circuit for applying to the semiconductor a voltage of particular magnitude sufficient to produce complete impact ionization in the semiconductor said voltage being applied transversely to the impurity concentration graduation, a core of magnetic material having a pair of pole pieces facing each other, the semiconductor being disposed in the gap between the pole pieces, a first coil wound on the core for producing, upon the application of a voltage to the coil, a biasing magnetic field of sufficient magnitude in the gap to prevent any impact ionization in the semiconductor at the applied voltage of particular magnitude, a second coil wound on the core to reduce the magnetic field an amount proportional to the magnitude of an input signal applied to the second coil and to produce a proportionate amount of impact ionization in the semiconductor and a corresponding reduction in its resistance.

5. An amplifying circuit including an output load in the circuit, a semiconductor body in the circuit, said semiconductor body having a high impurity concentration along one face thereof with said impurity concentration gradually changing to a relatively low concentration at the opposite body face, means for maintaining the semiconductor body at a sufficiently low temperature to make it non-conductive, a voltage source in the circuit for applying to the semiconductor a voltage across opposite faces of said semiconductor body which are transverse to the aforementioned faces of said body, said voltage being of a magnitude sufficient to produce complete impact ionization in the semiconductor body, means for subjecting the semiconductor to a magnetic field of sufficient magnitude to prevent any impact ionization in the semiconductor at the applied voltage of particular magnitude, and means for reducing the magnetic field an amount proportional to the magnitude of an input signal to be amplified to produce a proportionate amount of impact ionization in the semiconductor and a corresponding reduction in its resistance.

References Cited in the file of this patent

UNITED STATES PATENTS

| | | |
|---|---|---|
| 2,553,490 | Wallace | May 15, 1951 |
| 2,597,028 | Pfann | May 20, 1952 |
| 2,666,884 | Ericsson et al. | Jan. 19, 1954 |
| 2,736,858 | Welker | Feb. 28, 1956 |

OTHER REFERENCES

Sclar et al.: "Impact Ionization of Impurities in Germanium," The Physics and Chemistry of Solids, vol. 2, No. 1, March 1957, pages 1–23.